(12) United States Patent
Chiu et al.

(10) Patent No.: US 10,942,309 B2
(45) Date of Patent: Mar. 9, 2021

(54) LIGHT GUIDE PLATE AND INPUT APPARATUS

(71) Applicants: LITE-ON ELECTRONICS (GUANGZHOU) LIMITED, Guangzhou (CN); Lite-On Technology Corporation, Taipei (TW)

(72) Inventors: Shih-Wen Chiu, Taipei (TW); Yi-Wen Chen, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

(21) Appl. No.: 16/524,187

(22) Filed: Jul. 29, 2019

(65) Prior Publication Data

US 2020/0041718 A1 Feb. 6, 2020

Related U.S. Application Data

(60) Provisional application No. 62/712,993, filed on Aug. 1, 2018.

(30) Foreign Application Priority Data

Dec. 7, 2018 (CN) .......................... 201811493155.8

(51) Int. Cl.
*F21V 8/00* (2006.01)
*H01H 13/83* (2006.01)

(52) U.S. Cl.
CPC .......... *G02B 6/0088* (2013.01); *G02B 6/0068* (2013.01); *H01H 13/83* (2013.01); *H01H 2219/062* (2013.01)

(58) Field of Classification Search
CPC .. G02B 6/0068; G02B 6/0088; G02B 6/0033; G02B 6/0035; G02B 6/0038; H01H 13/83; H01H 2219/062
See application file for complete search history.

(56) References Cited

U.S. PATENT DOCUMENTS

| 5,867,772 | A  | * | 2/1999 | Jonsson | H04M 1/0249 455/575.1 |
|---|---|---|---|---|---|
| 7,407,314 | B2 | * | 8/2008 | Hsu | G02B 6/0018 362/23.03 |
| 7,543,971 | B2 | * | 6/2009 | Lee | G02B 6/0018 362/23.19 |
| 9,664,837 | B2 | * | 5/2017 | Tai | G02B 6/0091 |

(Continued)

*Primary Examiner* — Peggy A Neils
(74) *Attorney, Agent, or Firm* — JCIPRNET

(57) ABSTRACT

The present invention provides a light guide plate and an input apparatus. The light guide plate includes a light guide body, at least one first opening structure, and at least one second opening structure. The first opening structure passes through the light guide body and includes at least one first closed end. The second opening structure passes through the light guide body and includes at least one second closed end. The first closed end and the second closed end face each other. The first closed end partially overlaps the second closed end on at least one first axis, the first closed end and the second closed end are disposed parallel to each other on at least one second axis, and the first axis is substantially perpendicular to the second axis.

15 Claims, 11 Drawing Sheets

(56) References Cited

U.S. PATENT DOCUMENTS

| | | | |
|---|---|---|---|
| 2007/0062793 A1* | 3/2007 | Hung | H01H 13/83 200/310 |
| 2007/0209917 A1* | 9/2007 | Chiu | H01H 13/83 200/310 |
| 2009/0260965 A1* | 10/2009 | Chang | H01H 13/83 200/314 |
| 2009/0262081 A1* | 10/2009 | Chang | G06F 3/0202 345/170 |
| 2010/0300855 A1* | 12/2010 | Chen | H01H 13/83 200/314 |
| 2015/0332874 A1* | 11/2015 | Brock | H01H 13/702 200/5 A |
| 2018/0307958 A1* | 10/2018 | Lawson | G06F 3/04883 |
| 2019/0172663 A1* | 6/2019 | Yeh | H01H 13/83 |
| 2019/0391316 A1* | 12/2019 | Masuda | G02B 6/0023 |

* cited by examiner

LIGHT GUIDE PLATE AND INPUT APPARATUS

CROSS-REFERENCE TO RELATED APPLICATION

This application claims the priority benefits of U.S. provisional application Ser. No. 62/712,993, filed on Aug. 1, 2018, and China application serial no. 201811493155.8, filed on Dec. 7, 2018. The entirety of each of the above-mentioned patent applications is hereby incorporated by reference herein and made a part of this specification.

BACKGROUND OF THE INVENTION

1. Field of the Invention

The present invention relates to a light guide plate and an input apparatus, and in particular, to a single-sheet light guide plate and an input apparatus using the foregoing light guide plate.

2. Description of Related Art

Light guide plates currently applied to keyboard modules may be classified into multi-sheet assembled light guide plates and single-sheet light guide plate. The multi-sheet assembled light guide plates have an advantage of preventing a light mixing phenomenon occurring in two neighboring regions with different colors. However, the disadvantages are that assembling of the multi-sheet assembled light guide plates is relatively difficult and costs are high. The single-sheet light guide plate does not need to be assembled, but a disadvantage is that no divided regions are disposed thereon, and therefore light in two neighboring regions with different colors is likely to be mixed. Therefore, how to make a light guide plate have an advantage that light exists in different regions with different colors at low costs already becomes one of important subjects.

SUMMARY OF THE INVENTION

The present invention provides a light guide plate having a single-sheet structure, to achieve an effect that the divided regions are achieved by disposing a plurality of opening structures.

The present invention further provides an input apparatus, including the foregoing light guide plate, so as to avoid a light mixing phenomenon occurring in two neighboring light guide regions.

The present invention provides a light guide plate, including a light guide body, at least one first opening structure, and at least one second opening structure. The first opening structure passes through the light guide body and includes at least one first closed end. The second opening structure passes through the light guide body and includes at least one second closed end. The first closed end and the second closed end face each other. The first closed end partially overlaps the second closed end on at least one first axis, the first closed end and the second closed end are disposed parallel to each other on at least one second axis, and the first axis is substantially perpendicular to the second axis.

The present invention provides an input apparatus, including a keycap layer, a light guide plate, and a light source. The light guide plate is disposed below the keycap layer and includes a light guide body, at least one first opening structure, and at least one second opening structure. The light guide body includes at least two light guide regions. The first opening structure passes through the light guide body and includes at least one first closed end. The second opening structure passes through the light guide body and includes at least one second closed end. The first opening structure and the second opening structure are disposed between the light guide regions and spaced apart from each other. The first closed end and the second closed end face each other. The first closed end partially overlaps the second closed end on at least one first axis, the first closed end and the second closed end are disposed parallel to each other on at least one second axis, and the first axis is perpendicular to the second axis. The light source is disposed beside a side of the light guide plate.

The present invention provides a light guide plate including a light guide body, at least one first opening structure, and at least one second opening structure. The first opening structure passes through the light guide body and includes at least one first closed end. The second opening structure passes through the light guide body and includes at least one second closed end. The first closed end partially overlaps the second closed end on at least one first axis, and there is no opaque material disposed within the first closed end.

Based on the foregoing descriptions, the light guide plate in the present invention is a single-sheet light guide plate and achieves, by disposing a plurality of opening structures, an effect that regions are divided into. In addition, the opening structures in the present invention include closed ends such that the light is refracted and reflected thereby. Therefore, when the light in the light guide plate of the input apparatus in the present invention is incident to the closed ends of the opening structures, the light is reflected or totally reflected by the closed ends of the opening structures, and so that light is not mixed in neighboring light guide regions, and the neighboring light guide regions can be performed in different colors.

To make the aforementioned and other objectives and advantages of the present invention comprehensible, embodiments accompanied with figures are described in detail below.

BRIEF DESCRIPTION OF THE DRAWINGS

Accompany drawings are included to further understand the present invention, and the accompanying drawings are incorporated and constitute a part of this specification. The accompanying drawings describe embodiments of the present invention, and are used to explain the principle of the present invention together with descriptions.

FIG. 2I is a schematic top view of a light guide plate according to another embodiment of the present invention.

DESCRIPTION OF THE EMBODIMENTS

Figure 1A:
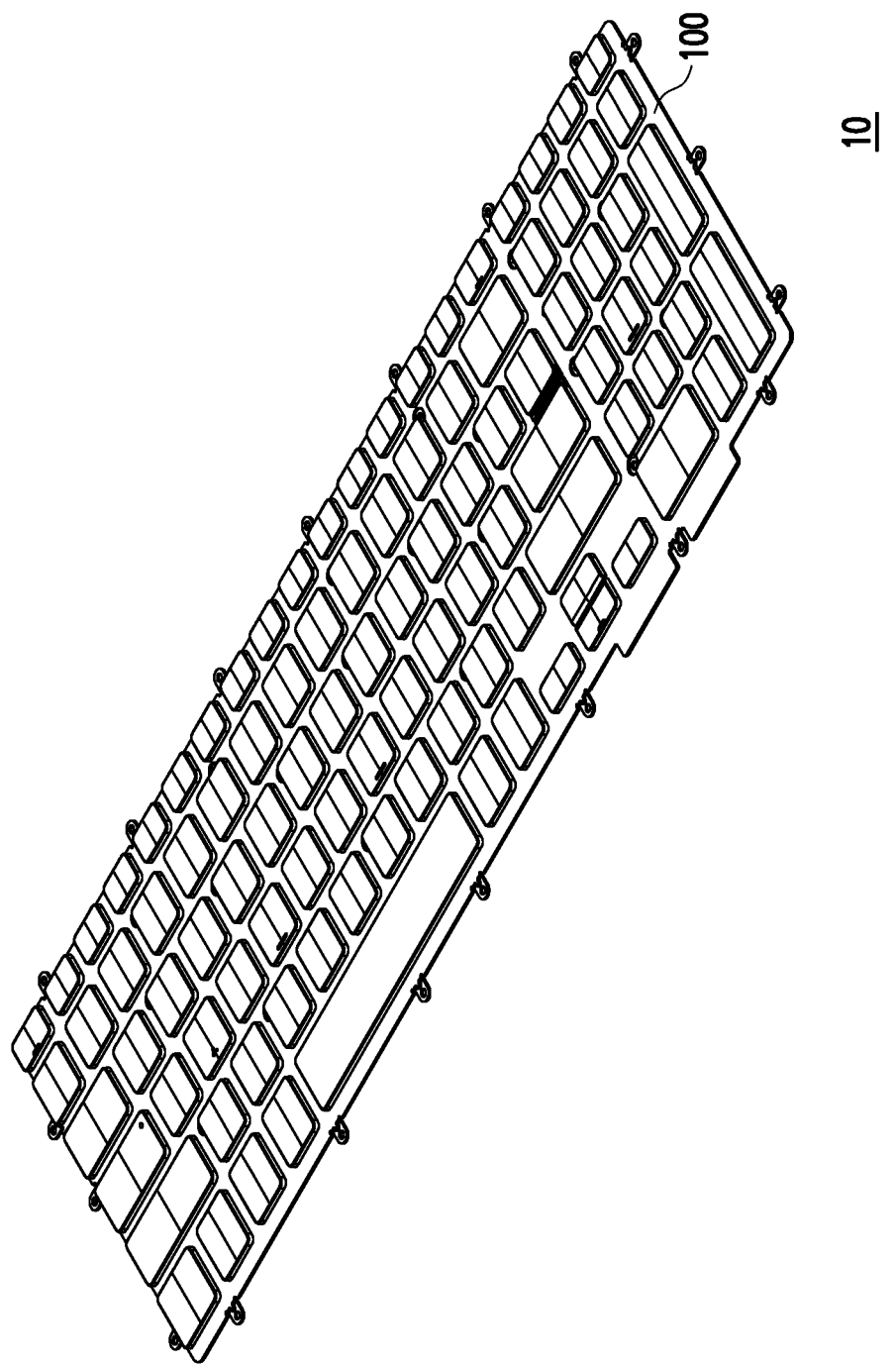
FIG. 1A is a schematic three-dimensional diagram of an input apparatus according to an embodiment of the present invention.

Examples of exemplary embodiments are described in the accompany drawings with reference to the exemplary embodiments of the present invention in detail. As long as possible, a same element numeral is used to represent a same or similar part in the drawings and descriptions.

Figure 1B:
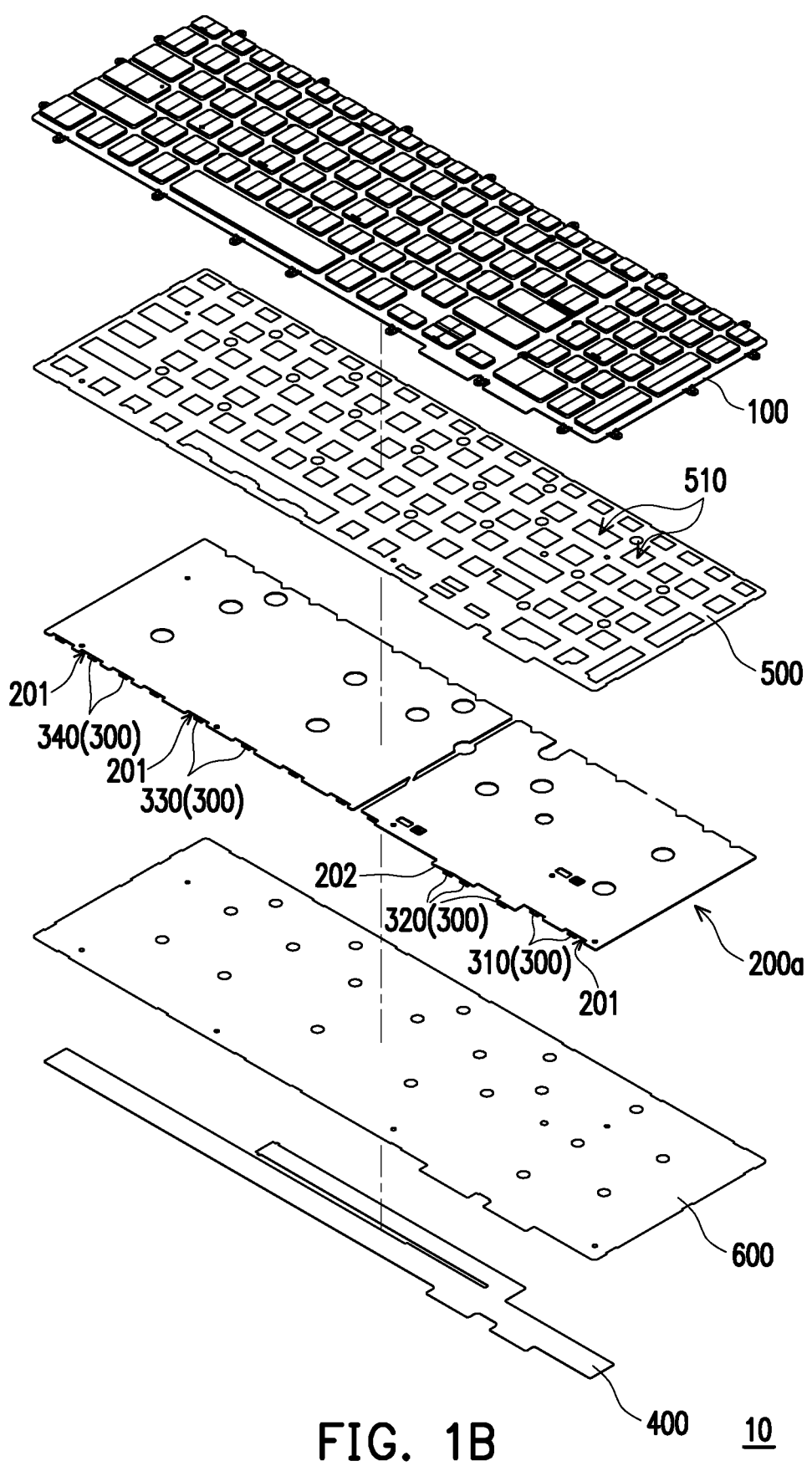
FIG. 1B is a schematic three-dimensional exploded view of the input apparatus in FIG. 1A.
Figure 2A:
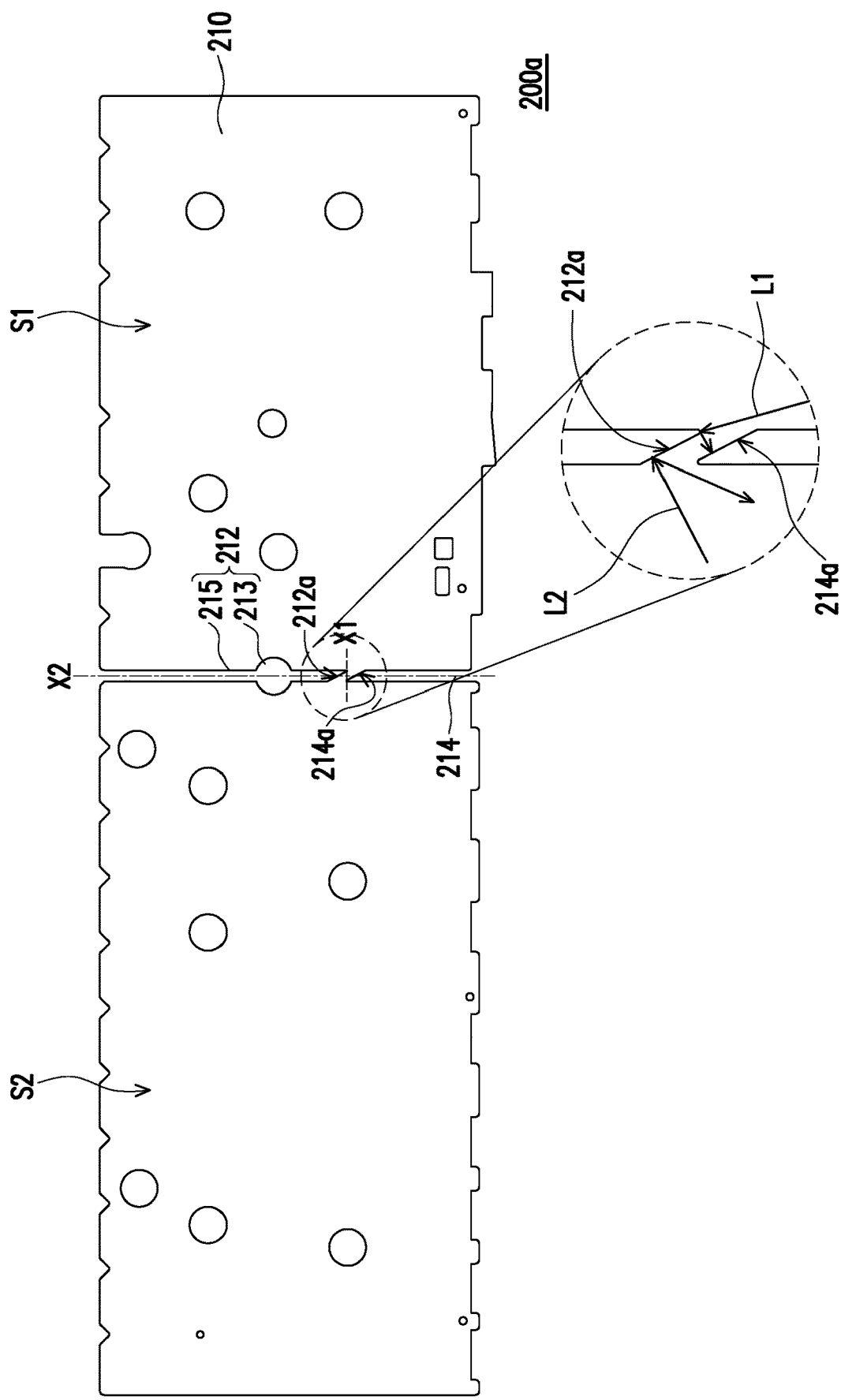
FIG. 2A is a schematic top view of a light guide plate of the input apparatus in FIG. 1A.

FIG. 1A is a schematic three-dimensional diagram of an input apparatus according to an embodiment of the present invention. FIG. 1B is a schematic three-dimensional exploded view of the input apparatus in FIG. 1A. FIG. 2A is a schematic top view of a light guide plate of the input apparatus in FIG. 1A. First referring to FIG. 1A, FIG. 1B, and FIG. 2A together. In this embodiment, an input apparatus 10 includes a keycap layer 100, a light guide plate 200a, a light source 300, and a circuit board 400. The light guide plate 200a is disposed below the keycap layer 100, and the light guide plate 200a includes a light guide body 210, at least one first opening structure 212 (where only one first opening structure 212 is schematically drawn in FIG. 2A), and at least one second opening structure 214 (where only one second opening structure 214 is schematically drawn in FIG. 2A). The first opening structure 212 passes through the light guide body 210 and includes at least one first closed end 212a (where only one first closed end 212a is schematically drawn in FIG. 2A). The second opening structure 214 passes through the light guide body 210 and includes at least one second closed end 214a (where only one second closed end 214a is schematically drawn in FIG. 2A). The first opening structure 212 and the second opening structure 214 are separated from each other to divide the light guide body 210 into at least two light guide regions S1 and S2 (where only two light guide regions are schematically drawn in FIG. 2A). The first closed end 212a and the second closed end 214a face each other and are suitable for refracting and reflecting light. The first closed end 212a partially overlaps the second closed end 214a on at least one first axis X1, the first closed end 212a and the second closed end 214a are disposed parallel to each other on at least one second axis X2, and the second axis X2 is perpendicular to the first axis X1. The light source 300 is disposed beside a side of the light guide plate 200a, and the circuit board 400 is disposed below the light guide plate 200a. The light source 300 is electrically connected to the circuit board 400.

Further, the input apparatus 10 in this embodiment is specifically a light emitting keyboard module, and the light guide plate 200a is specifically a single-sheet light guide plate. The first opening structure 212 and the second opening structure 214 are disposed to divide the light guide body 210 into the at least two light guide regions S1 and S2. As shown in FIG. 2A, a shape of the first closed end 212a of the first opening structure 212 and a shape of the second closed end 214a of the second opening structure 214 are the same. The shapes are an oblique surface, but not limited thereto. When the light source 300 emits light L1 and the light L2, the light L1 and the light L2 are incident to the light guide body 210, and is reflected or refracted by the first closed end 212a and the second closed end 214a, so that the light guide regions S1 and S2 are displayed in different colors. When incident angles of the light L1 and the light L2 are less than a critical angle, the light L1 and the light L2 may be alternatively totally reflected by the first closed end 212a and the second closed end 214a. Preferably, the first closed end 212a partially overlaps the second closed end 214a on the first axis X1. This can effectively reflect or totally reflect the light L1 to prevent the light L1 from entering the light guide region S2, and effectively reflect or totally reflect the light L2 to prevent the light L2 from entering the light guide region S1. Therefore, a light mixing phenomenon does not occur in the two neighboring light guide regions S1 and S2. As shown in FIG. 2A, the first closed end 212a and the second closed end 214a are disposed along the second axis X2. That is, the first closed end 212a and the second closed end 214a are parallel to each other on the second axis X2.

In addition, referring to FIG. 1B again, the input apparatus 10 in this embodiment further includes a mask layer 500, disposed between the keycap layer 100 and the light guide plate 200a. Light emitted by the light source 300 is transmitted in the light guide plate 200a, and is emitted from an opening 510 of the mask layer 500 to illuminate the keycap layer 100. In addition, the input apparatus 10 in this embodiment further includes a reflection layer 600, disposed below the light guide plate 200a and located between the light guide plate 200a and the circuit board 400, to reflect the light emitted by the light source 300. That is, the reflection layer 600 may reflect the light back to the light guide plate 200a, to improve utilization of the light source 300. Herein, the light source 300 includes a plurality of light emitting diodes 310, 320, 330, and 340, and the light emitting diodes 310, 320, 330, and 340 respectively correspond to the light guide regions S1 and S2, and the light emitting diodes 310, 320, 330, and 340 are disposed beside of the side of the light guide 200a. The light emitting diodes 310, 320, 330, and 340 may be, for example, red light emitting diodes, blue light emitting diodes, or green light emitting diodes, but are not limited thereto. In other words, the light emitting diodes 310 and 320 in a same color correspond to the light guide region S1, and the light emitting diodes 330 and 340 in a same color correspond to the light guide region S2. By using design of the first closed end 212a of the first opening structure 212 and the second closed end 214a of the second opening structure 214, an effect that regions are divided into and light is not mixed can be achieved. In this embodiment, the side of the light guide plate 200a comprises a plurality of recesses 201 and two protrusions 202, and the light emitting diodes 320 are disposed beside the protrusions 202 of the side of the light guide plate 200a, and the light emitting diodes 310, 330, and 340 are disposed beside the recesses 201 of the side of the light guide plate 200a.

In particular, referring to FIG. 1B and FIG. 2A again, the first opening structure 212 includes a circular portion 213 and an extending portion 215 extending from the circular portion 213. A post (not shown in figures) is able to be disposed through the circular portion 213, and the post can be a screw boss, a hot melting pillar and so on, but the present invention is not limited thereto. In this embodiment, no part of the mask layer 500 and no part of the reflection layer 600 extend into the extending portion 215 of the first opening structure 212. In other words, there is no opaque material disposed within the first closed end 212a of the first opening structure 212. In other embodiment not shown, the second opening structure may include a circular portion and an extending portion, and no part of the mask layer and no part of the reflection layer extend into the extending portion of the second opening structure, which shall fall within the protection scope of the present invention.

In short, in design of the light guide plate 200a in this embodiment, the first opening structure 212 and the second opening structure 214 are separated from each other to divide the light guide body 210 into the light guide regions S1 and S2. That is, the light guide plate 200a in this embodiment is specifically a single-sheet light guide plate, and achieves, by disposing of the first opening structure 212 and the second opening structure 214, an effect that regions are divided into. In addition, the first opening structure 212 and the second opening structure 214 in this embodiment respectively include the first closed end 212a and the second closed end 214a that can refract and reflect light. Therefore, the input apparatus 10 using the light guide plate 200a in this embodiment can reflect or totally reflect light when the light source 300 is incident to the first closed end 212a and the second closed end 214a, so that the neighboring light guide regions S1 and S2 can be displayed in different colors, and a light mixing phenomenon is prevented.

It should be noted herein that element numerals and partial content of the foregoing embodiment are still used in the following embodiments. Same numerals are used to represent same or similar elements, and descriptions of same technical content are omitted. For descriptions of the omitted part, reference may be made to the foregoing embodiment. Details are not described in the following embodiments again.

Figure 2B:
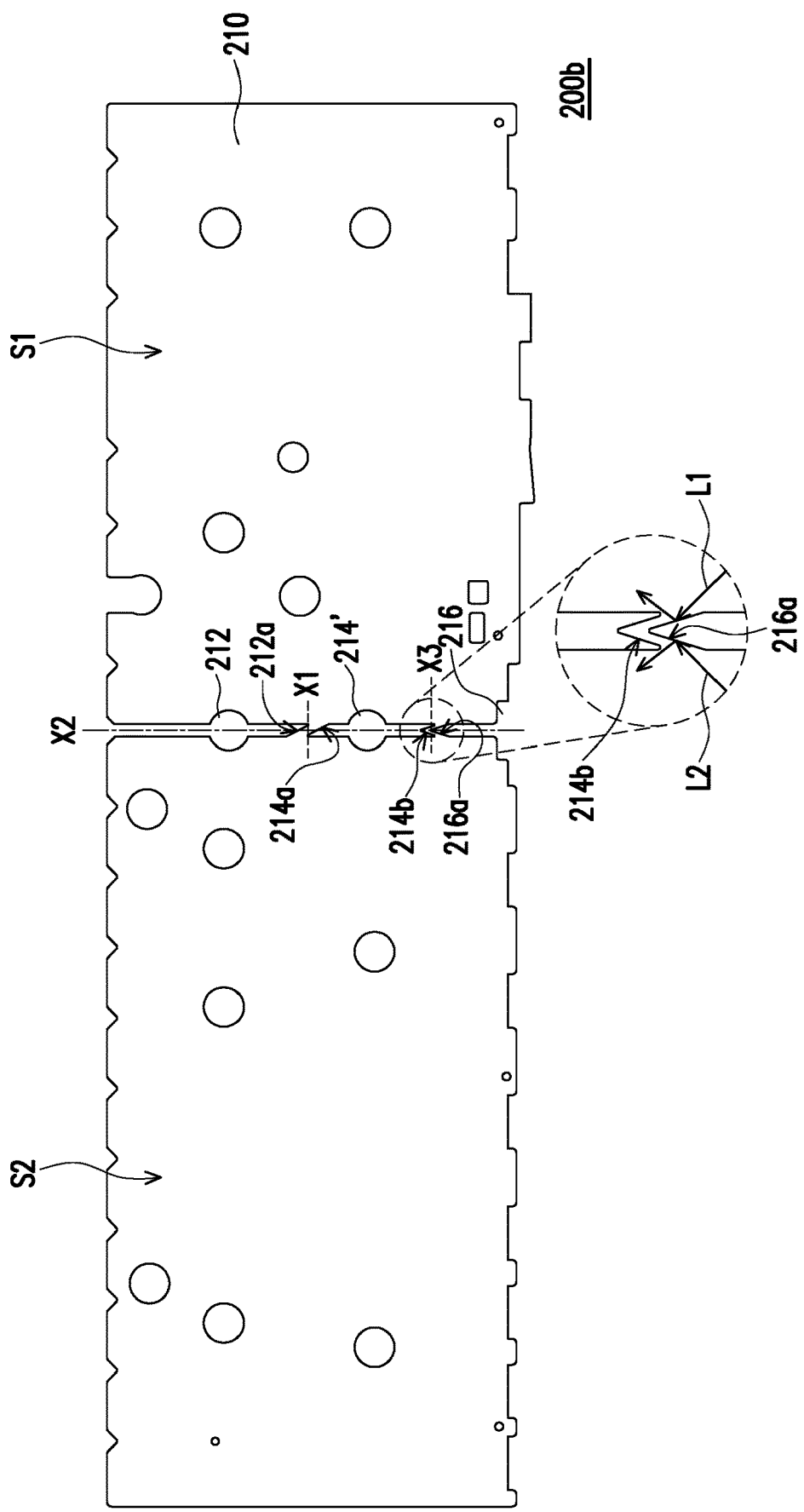
FIG. 2B is a schematic top view of a light guide plate according to an embodiment of the present invention.

FIG. 2B is a schematic top view of a light guide plate according to an embodiment of the present invention. Referring to both FIG. 2A and FIG. 2B, a light guide plate 200b in this embodiment is similar to the light guide plate 200a in FIG. 2A. A main difference between the light guide plate 200b and the light guide plate 200a lies in that the light guide plate 200b in this embodiment further includes at least one third opening structure 216 (where only one third opening structure 216 is schematically drawn in FIG. 2B), passing through the light guide body 210 and including at least one third closed end 216a (where only one third closed end 216a is schematically drawn in FIG. 2B). A second opening structure 214' further includes at least one fourth closed end 214b (where only one fourth closed end 214b is schematically drawn in FIG. 2B). The fourth closed end 214b is disposed parallel to the third closed end 216a on a second axis X2, the third closed end 216a partially overlaps the fourth closed end 214b on at least one third axis X3 (where only one third axis X3 is schematically drawn in FIG. 2B), and a first axis X1 is parallel to the third axis X3. The second closed end 214a and the fourth closed end 214b are respectively located at two ends of the second opening structure 214, and the first closed end 212a, the second closed end 214a, the third closed end 216a, and the fourth closed end 214b are disposed along the second axis X2. Herein, a shape of the third closed end 216a of the third opening structure 216 and a shape of the fourth closed end 214b of the second opening structure 214' are the same. The shapes are a triangle, but not limited thereto. When the light source 300 (referring to FIG. 1B) emits the light L1 and the light L2, the light L1 and the light L2 are incident to the light guide body 210, and is reflected and/or totally reflected by the first closed end 212a, the second closed end 214a, the third closed end 216a, and the fourth closed end 214b, so that light is not mixed in the light guide regions S1 and S2, and the light guide regions S1 and S2 may be displayed in different colors.

Figure 2C:
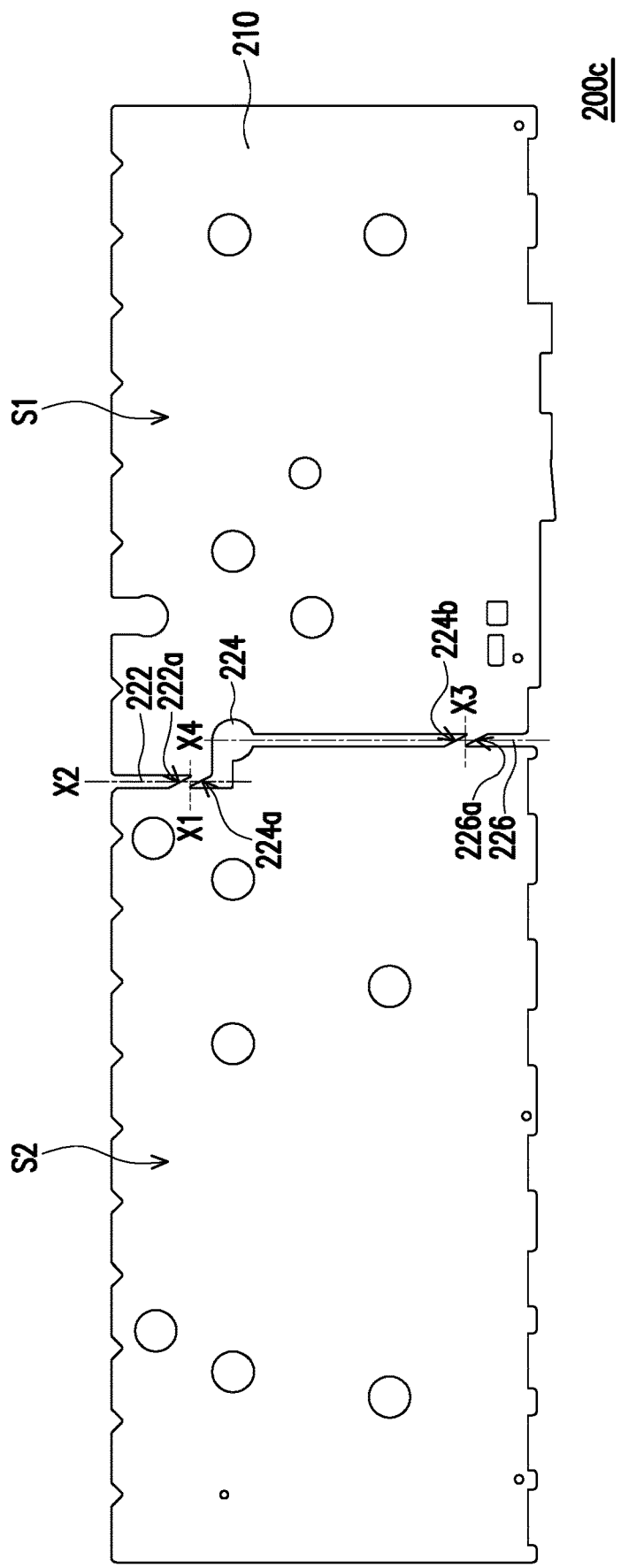
FIG. 2C is a schematic top view of a light guide plate according to another embodiment of the present invention.

FIG. 2C is a schematic top view of a light guide plate according to another embodiment of the present invention. Referring to both FIG. 2B and FIG. 2C, a light guide plate 200c in this embodiment is similar to the light guide plate 200b in FIG. 2B. A main difference between the light guide plate 200c and the light guide plate 200b lies in that a first closed end 222a of a first opening structure 222 in this embodiment is disposed parallel to a second closed end 224a of a second opening structure 224 along a second axis X2, a third closed end 226a of a third opening structure 226 is disposed parallel to a fourth closed end 224b of the second opening structure 224 along a fourth axis X4, and the fourth axis X4 is parallel to the second axis X2. Herein, a shape of the first closed end 222a of the first opening structure 222 and a shape of the second closed end 224a of the second opening structure 224 are the same. The shapes are an oblique surface, but not limited thereto. A shape of the third closed end 226a of the third opening structure 226 and a shape of the fourth closed end 224b of the second opening structure 224 are the same. The shapes are an oblique surface, but not limited thereto.

Figure 2D:
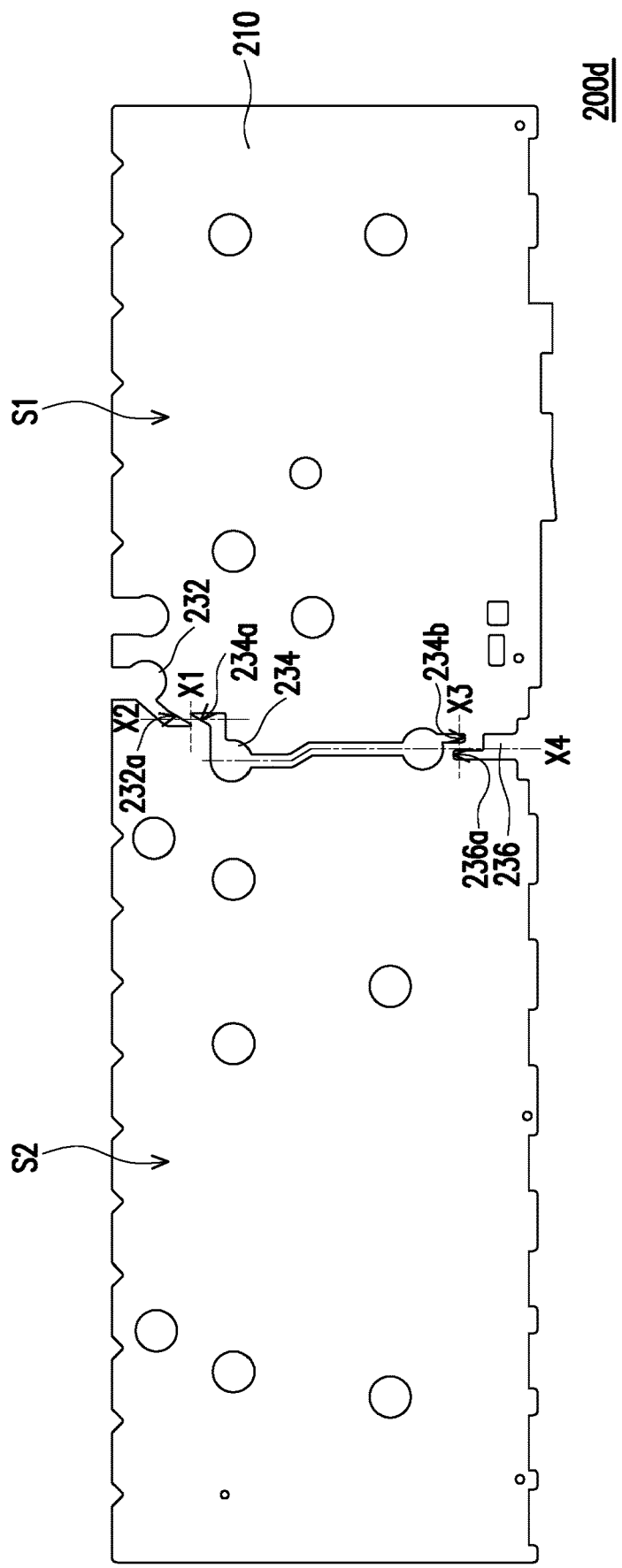
FIG. 2D is a schematic top view of a light guide plate according to another embodiment of the present invention.

FIG. 2D is a schematic top view of a light guide plate according to another embodiment of the present invention. Referring to both FIG. 2C and FIG. 2D, a light guide plate 200d in this embodiment is similar to the light guide plate 200c in FIG. 2C. A main difference between the light guide plate 200d and the light guide plate 200c lies in that in this embodiment, a shape of a first closed end 232a of a first opening structure 232 and a shape of a second closed end 234a of a second opening structure 234 are the same. The shapes are an oblique surface, but not limited thereto. A shape of a third closed end 236a of a third opening structure 236 and a shape of a fourth closed end 234b of the second opening structure 234 are the same. The shapes are an L-shape, but not limited thereto.

Figure 2E:
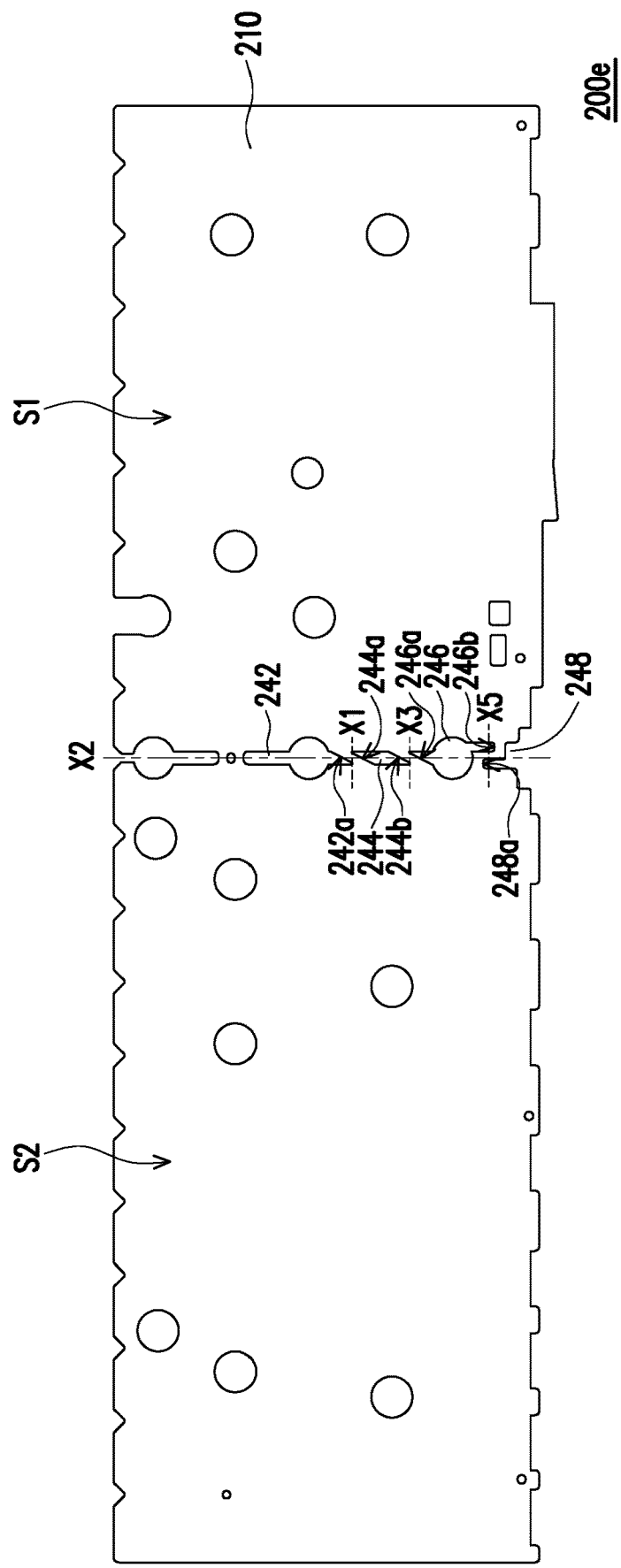
FIG. 2E is a schematic top view of a light guide plate according to another embodiment of the present invention.

FIG. 2E is a schematic top view of a light guide plate according to another embodiment of the present invention. Referring to both FIG. 2C and FIG. 2E, a light guide plate 200e in this embodiment is similar to the light guide plate 200c in FIG. 2C. A main difference between the light guide plate 200e and the light guide plate 200c lies in that the light guide plate 200e in this embodiment further includes at least one fourth opening structure 248 (where only one fourth opening structure 248 is schematically drawn in FIG. 2E), passing through the light guide body 210 and including at least one fifth closed end 248a (where only one fifth closed end 248a is schematically drawn in FIG. 2E). A third opening structure 246 further includes at least one sixth closed end 246b (where only one sixth closed end 246b is schematically drawn in FIG. 2E). The sixth closed end 246b is disposed parallel to the fifth closed end 248a on a second axis X2, the fifth closed end 248a partially overlaps the sixth closed end 246b on at least one axis (that is, a fifth axis X5) (where only one fifth axis X5 is schematically drawn in FIG. 2E), and the fifth axis X5 is parallel to a third axis X3. A third closed end 246a and the sixth closed end 246b are respectively located at two ends of the third opening structure 246. Herein, a shape of a first closed end 242a of a first opening structure 242 and a shape of a second closed end 244a of a second opening structure 244 are the same. The shapes are an oblique surface, but not limited thereto. A shape of the third closed end 246a of the third opening structure 246 and a shape of a fourth closed end 244b of the second opening structure 244 are the same. The shapes are an oblique surface, but not limited thereto. A shape of the fifth closed end 248a of the fourth opening structure 248 and a shape of the sixth closed end 246b of the third opening structure 246 are the same. The shapes are an L-shape, but not limited thereto.

Figure 2F:
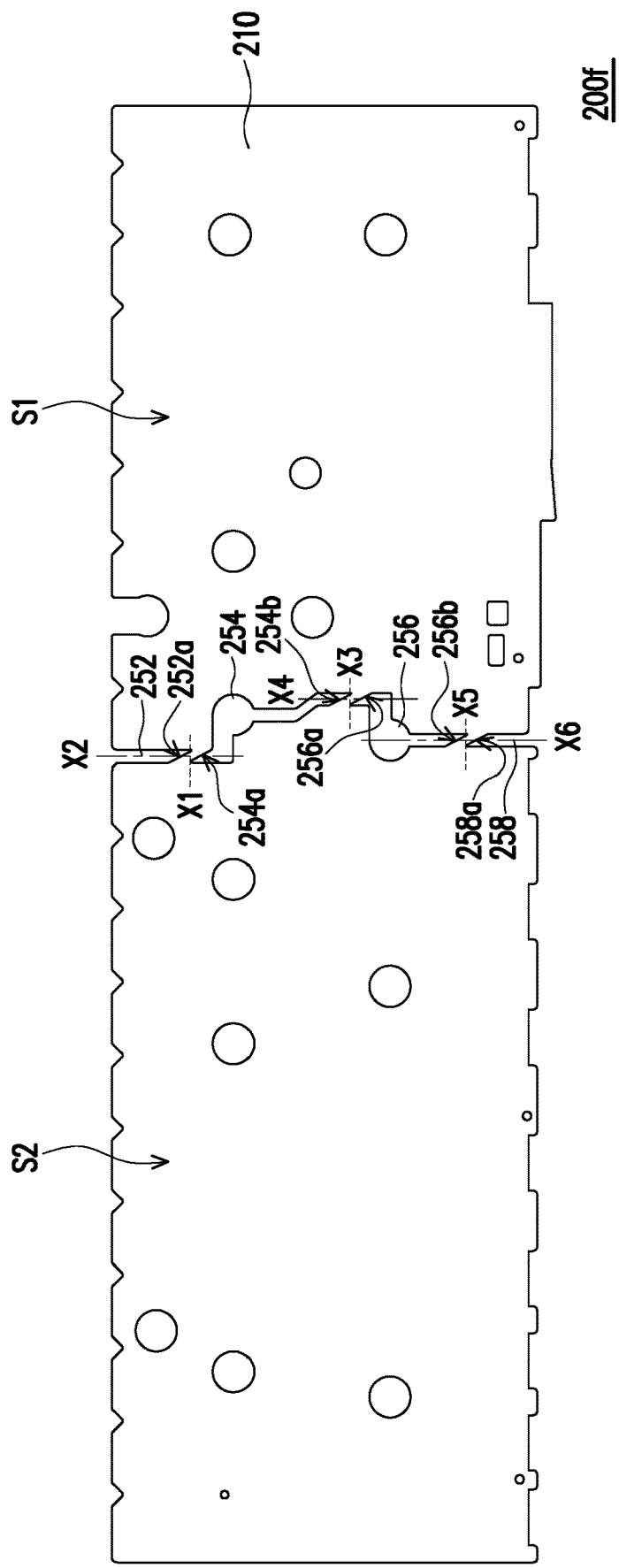
FIG. 2F is a schematic top view of a light guide plate according to another embodiment of the present invention.

FIG. 2F is a schematic top view of a light guide plate according to another embodiment of the present invention.

Referring to both FIG. 2C and FIG. 2F, a light guide plate 200f in this embodiment is similar to the light guide plate 200c in FIG. 2C. A main difference between the light guide plate 200f and the light guide plate 200c lies in that the light guide plate 200f in this embodiment further includes at least one fourth opening structure 258 (where only one fourth opening structure 258 is schematically drawn in FIG. 2F), passing through the light guide body 210 and including at least one fifth closed end 258a (where only one fifth closed end 258a is schematically drawn in FIG. 2F). A third opening structure 256 further includes at least one sixth closed end 256b (where only one sixth closed end 256b is schematically drawn in FIG. 2F). The sixth closed end 256b is parallel to the fifth closed end 258a on at least one sixth axis X6 (where only one sixth axis X6 is schematically drawn in FIG. 2F). The fifth closed end 258a partially overlaps the sixth closed end 256b on a fifth axis X5, and the fifth axis X5 is parallel to a third axis X3. A third closed end 256a and the sixth closed end 256b are respectively located at two ends of the third opening structure 256. The sixth axis X6 is parallel to a fourth axis X4, and the sixth axis X6 is located between a second axis X2 and the fourth axis X4. Herein, a shape of a first closed end 252a of a first opening structure 252 and a shape of a second closed end 254a of a second opening structure 254 are the same. The shapes are an oblique surface, but not limited thereto. A shape of the third closed end 256a of the third opening structure 256 and a shape of a fourth closed end 254b of the second opening structure 254 are the same. The shapes are an oblique surface, but not limited thereto. A shape of the fifth closed end 258a of the fourth opening structure 258 and a shape of the sixth closed end 256b of the third opening structure 256 are the same. The shapes are an oblique surface, but not limited thereto.

Figure 2G:
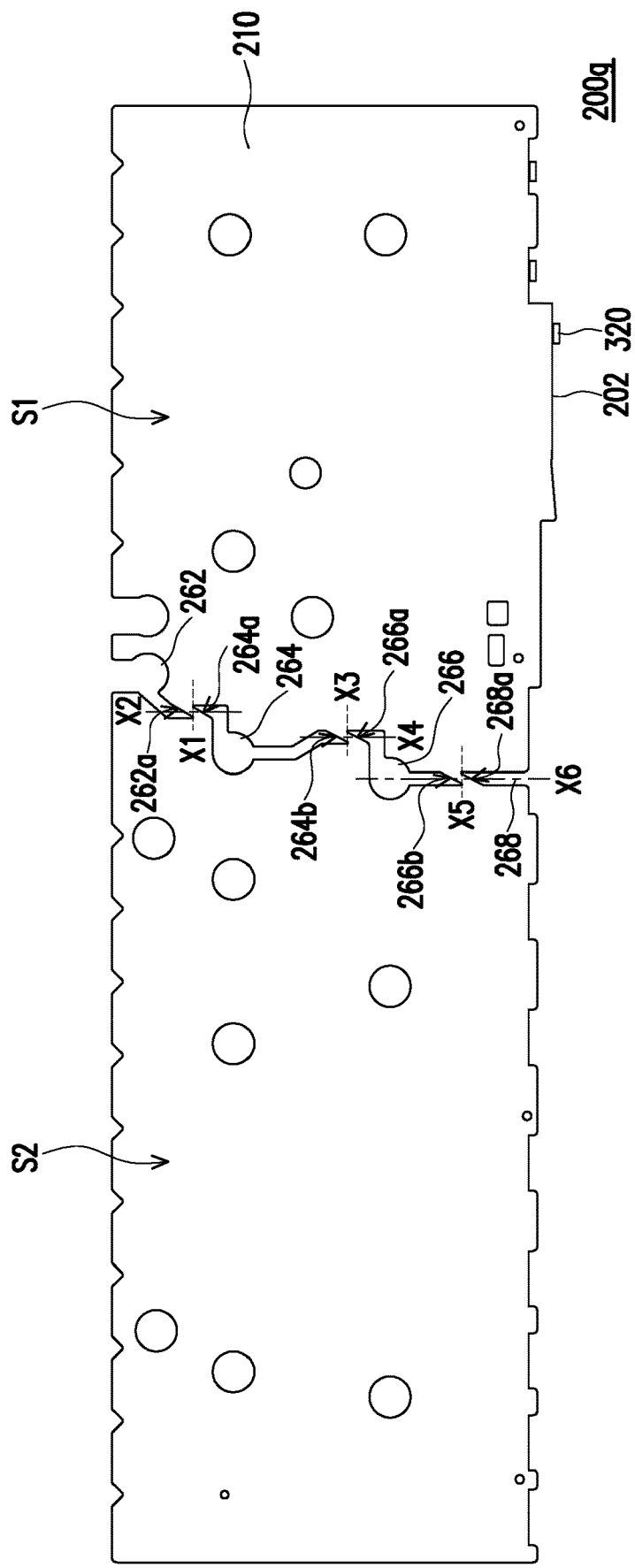
FIG. 2G is a schematic top view of a light guide plate according to another embodiment of the present invention.

FIG. 2G is a schematic top view of a light guide plate according to another embodiment of the present invention. Referring to both FIG. 2F and FIG. 2G, a light guide plate 200g in this embodiment is similar to the light guide plate 200f in FIG. 2F. A main difference between the light guide plate 200g and the light guide plate 200f lies in that a fourth axis X4 is located between a second axis X2 and a sixth axis X6. To be more specific, a third closed end 266a and a fourth closed end 264b in this embodiment are along the fourth axis X4, a first closed end 262a and a second closed end 264a are along the second axis X2, a fifth closed end 268a and a sixth closed end 266b are along the sixth axis X6, and the fourth axis X4 is located between the second axis X2 and the sixth axis X6. Herein, a shape of the first closed end 262a of a first opening structure 262 and a shape of the second closed end 264a of a second opening structure 264 are an oblique surface, but not limited thereto. A shape of the third closed end 266a of a third opening structure 266 and a shape of the fourth closed end 264b of a second opening structure 264 are an oblique surface, but not limited thereto. A shape of the fifth closed end 268a of a fourth opening structure 268 and a shape of the sixth closed end 266b of the third opening structure 266 are an oblique surface, but not limited thereto. In this embodiment, the side of the light guide plate 200g comprises a protrusion 202, and the light emitting diode 320 is disposed beside the protrusion 202 of the side of the light guide plate 200g.

Figure 2H:
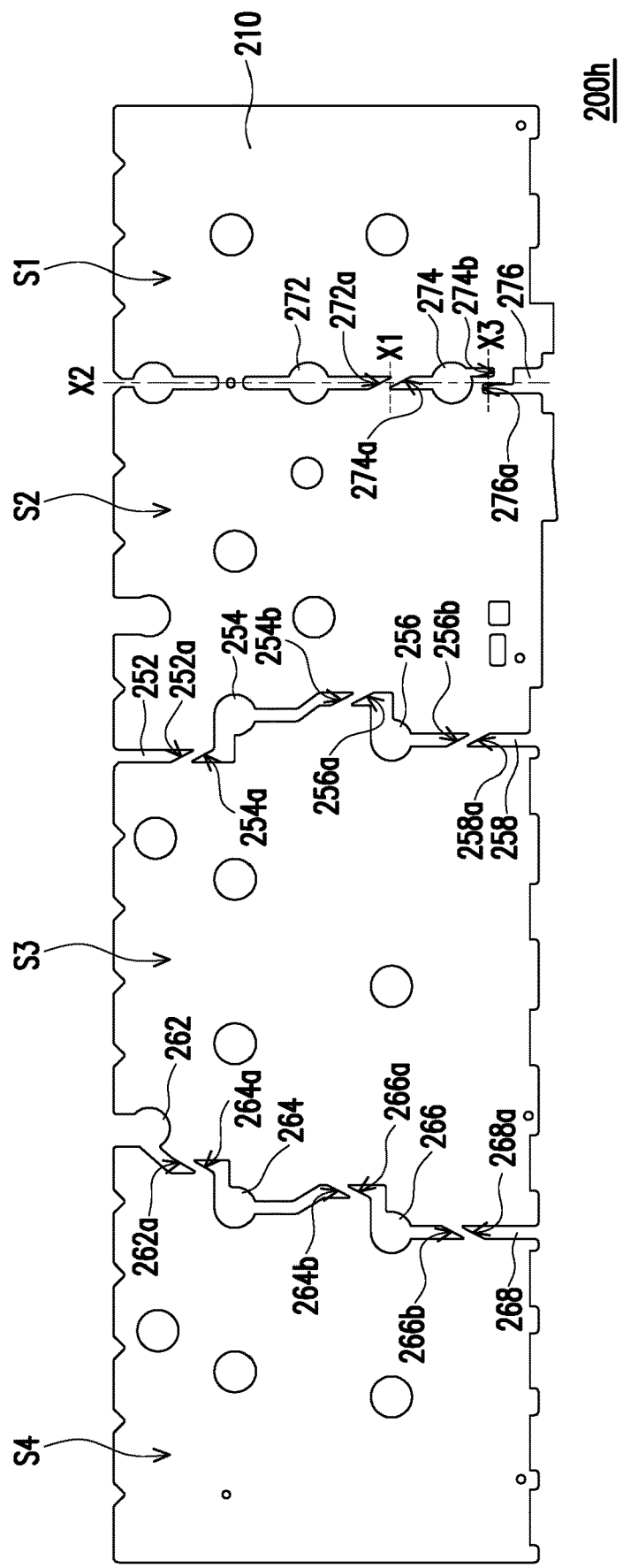
FIG. 2H is a schematic top view of a light guide plate according to another embodiment of the present invention.
Figure 21:
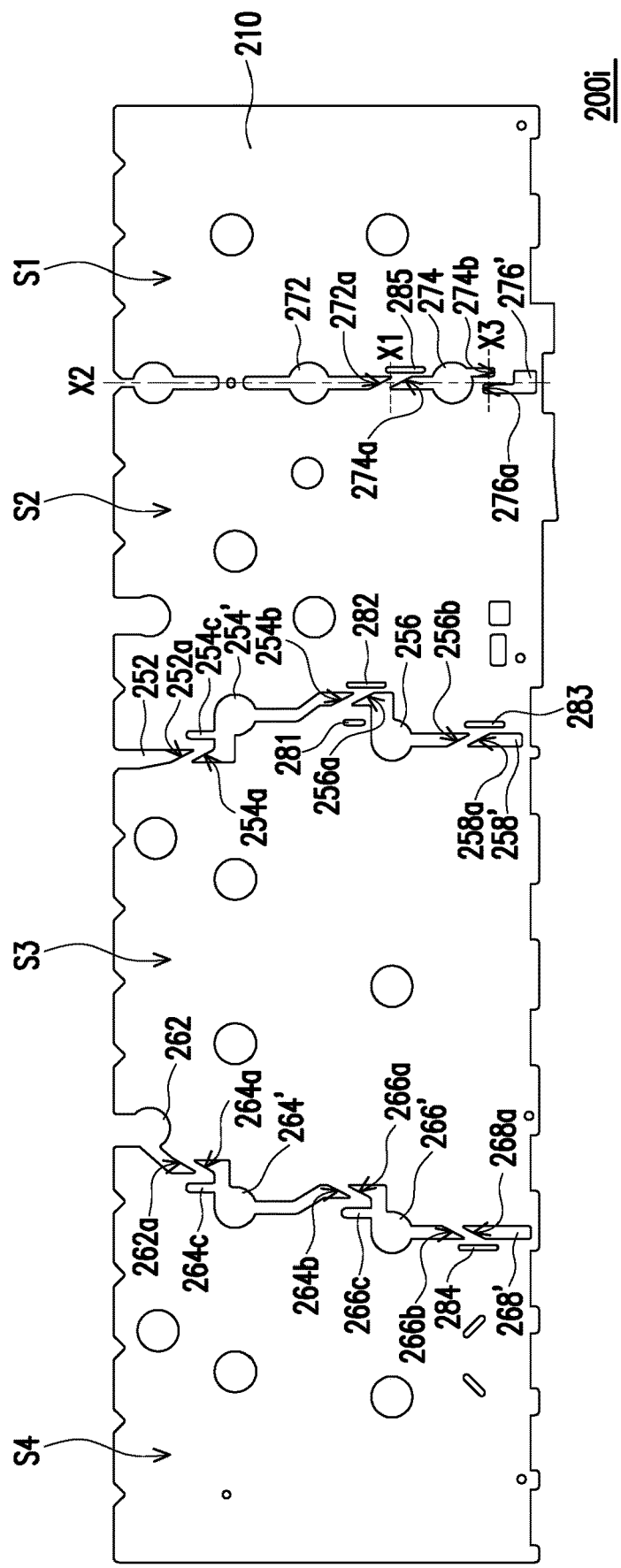

FIG. 2H is a schematic top view of a light guide plate according to another embodiment of the present invention. Referring to FIG. 2H, in this embodiment, a light guide plate 200h includes a light guide body 210, and first opening structures 252, 262, and 272, second opening structures 254, 264, and 274, third opening structure 256, 266, and 276, and fourth opening structures 258 and 268 that divide the light guide body 210 into light guide regions S1, S2, S3, and S4. That is, for an input apparatus using the light guide plate 200h in this embodiment, if the light emitting diodes 310, 320, 330, and 340 (referring to FIG. 1B) of the light source 300 (referring to FIG. 1B) may respectively emit different light of different colors, the light guide regions S1, S2, S3, and S4 of the light guide plate 200h may be displayed in four different colors, and a light mixing phenomenon is prevented.

Herein, for specific structures of the first opening structures 252 and 262, the second opening structures 254 and 264, the third opening structures 256 and 266, and the fourth opening structures 258 and 268, reference may be made to descriptions of FIG. 2F and FIG. 2G. Details are not described herein again. A first closed end 272a, a second closed end 274a, a third closed end 276a, and a fourth closed end 274b are disposed parallel to each other along a second axis X2. The first closed end 272a partially overlaps the second closed end 274a on a first axis X1, and the third closed end 276a partially overlaps the fourth closed end 274b on a third axis X3. Herein, a shape of the first closed end 272a of the first opening structure 272 and a shape of the second closed end 274a of the second opening structure 274 are the same. The shapes are an oblique surface, but not limited thereto. A shape of the third closed end 276a of the third opening structure 276 and a shape of the fourth closed end 274b of the second opening structure 274 are the same. The shapes are an L-shape, but not limited thereto.

FIG. 2I is a schematic top view of a light guide plate according to another embodiment of the present invention. Referring to both FIG. 2H and FIG. 2I, a light guide plate 200i in this embodiment is similar to the light guide plate 200h in FIG. 2H. A main difference between the light guide plate 200i and the light guide plate 200h lies in that the structures of the second opening structures 254', 264', the third opening structures 266', 276' and the fourth opening structures 258', 268' of the present embodiment are different from the structures of the second opening structures 254, 264, the third opening structures 266, 276 and the fourth opening structures 258, 268.

In detail, the second opening structures 254', 264' further include reinforcing closed end 254c, 264c, respectively, wherein the reinforcing closed end 254c extends parallel to the second axis X2 and is located at a side of a boundary between the first closed end 252a and the second closed end 254a, and the reinforcing closed end 264c extends parallel to the second axis X2 and is located at a side of a boundary between the first closed end 262a and the second closed end 264a. The third opening structure 266' further includes a reinforcing closed end 266c extends parallel to the second axis X2 and is located at a side of a boundary between the third closed end 266a and the fourth closed end 264b. The reinforcing closed ends 254c, 264c shield the boundary between the first closed ends 252a, 262a and the second closed ends 254a, 264a to enhance the local area to refract light to avoid dark areas. The reinforcing closed end 266c shields the boundary between the third closed end 266a and the fourth closed end 264b to enhance the local area to refract light to avoid dark areas. The third opening structure 276' and the fourth opening structures 258', 268' do not extend to the edge of the light guide body 210, so that one end of the third opening structure 276' relative to the third closed end 276a and one end of the fourth opening structures 258', 268' relative to the fifth closed end 258a, 268a are closed ends rather than open ends.

In addition, the light guide plates 200i of the embodiment further includes at least one reinforcing opening structure (where five reinforcing opening structures 281, 282, 283, 284, 285 are schematically drawn in FIG. 2I). The reinforcing opening structures 281, 282 are respectively disposed on opposite sides of the boundary between the third closed end 256a and the fourth closed end 254b to enhance the local area to refract light to avoid dark areas. The reinforcing opening structure 283 is disposed at a side of the boundary between the fifth closed end 258a and the sixed closed end 256b to enhance the local area to refract light to avoid dark areas. The reinforcing opening structure 284 is disposed at a side of the boundary between the fifth closed end 268a and the sixed closed end 266b to enhance the local area to refract light to avoid dark areas. The reinforcing opening structure 285 is disposed at a side of the boundary between the first closed end 272a and the second closed end 274a to enhance the local area to refract light to avoid dark areas.

It should be noted that the light guide plates 200a, 200b, 200c, 200d, 200e, 200f, 200g, 200h, and 200i in the embodiments do not limit a quantity (but two or more is at least needed) and structural forms of opening structures, which shall fall within the protection scope of the present invention, provided that closed ends that face each other of two opposite opening structures are parallel to each other, overlap on an axis, and are disposed along another axis perpendicular to the axis. A shape of the closed end may be an oblique surface, a triangle, an L-shape, or another suitable shape. Any shape suitable for reflecting, refracting, and/or totally reflecting light shall fall within the protection scope of the present invention.

In conclusion, in design of a light guide plate in the present invention, a first opening structure and a second opening structure are separated from each other to divide a light guide body into at least two light guide regions. That is, the light guide plate in the present invention is a single-sheet light guide plate and achieves, by disposing of opening structures, an effect that regions are divided into. In addition, the opening structures in the present invention include closed ends that can refract and reflect light. Therefore, the input apparatus using the light guide plate in the present invention can reflect or totally reflect light when a light source is incident to the closed ends of the opening structures, so that light is not mixed in neighboring light guide regions, and the neighboring light guide regions can be displayed in different colors.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An input apparatus, comprising:
   a keycap layer;
   a light guide plate, disposed below the keycap layer and comprising:
   a light guide body comprising at least two light guide regions;
   at least one first opening structure, passing through the light guide body and comprising at least one first closed end; and
   at least one second opening structure, passing through the light guide body and comprising at least one second closed end, wherein the at least one first opening structure and the at least one second opening structure are disposed between the at least two light guide regions and spaced apart from each other, the at least one first closed end and the at least one second closed end face each other, the at least one first closed end partially overlaps the at least one second closed end on at least one first axis, the at least one first closed end and the at least one second closed end are disposed parallel to each other on at least one second axis, and the at least one first axis is perpendicular to the at least one second axis;
   a light source disposed beside a side of the light guide plate;
   a mask layer disposed between the keycap layer and the light guide plate; and
   a reflection layer disposed below the light guide plate,
   wherein the at least one first opening structure or the at least one second opening structure comprising a circular portion and an extending portion extending from the circular portion, no part of the mask layer and no part of the reflection layer extending into the extending portion of the at least one first opening structure or the at least one second opening structure.

2. The input apparatus according to claim 1, wherein a shape of the at least one first closed end and a shape of the at least one second closed end are the same, and the shape comprises one of an oblique surface, an L-shape, or a triangle.

3. The input apparatus according to claim 1, wherein the light guide plate further comprises:
   at least one third opening structure, passing through the light guide body and comprising at least one third closed end and disposed between the at least two light guide regions and space apart from the at least one second opening structure, wherein the at least one second opening structure further comprises at least one fourth closed end, the at least one third closed end and the at least one fourth closed end face each other, the at least one third closed end is disposed parallel to the at least one fourth closed end on the at least one second axis, the at least one third closed end partially overlaps the at least one fourth closed end on at least one third axis, the at least one first axis is parallel to the at least one third axis, the at least one second closed end and the at least one fourth closed end are respectively located at two ends of the at least one second opening structure.

4. The input apparatus according to claim 3, wherein the light guide plate further comprises:
   at least one fourth opening structure, passing through the light guide body and comprising at least one fifth closed end, wherein the at least one third opening structure further comprises at least one sixth closed end, the at least one fifth closed end is disposed parallel to the at least one sixth closed end along the at least one second axis, the at least one fifth closed end partially overlaps the at least one sixth closed end on at least one fifth axis, the at least one fifth axis is parallel to the at least one third axis, and the at least one third closed end and the at least one sixth closed end are respectively located at two ends of the at least one third opening structure.

5. The input apparatus according to claim 1, wherein the at least one second opening structure further comprises a reinforcing closed end extending parallel to the at least one second axis, and located at a side of a boundary between the at least one first closed end and the at least one second closed end.

6. The input apparatus according to claim 1, wherein the light guide plate further comprises:
at least one third opening structure comprising at least one third closed end, wherein the at least one second opening structure further comprises at least one fourth closed end, the at least one third closed end is disposed parallel to the at least one fourth closed end along at least one fourth axis, the at least one third closed end partially overlaps the at least one fourth closed end on at least one third axis, the at least one first axis is parallel to the at least one third axis, the at least one second closed end and the at least one fourth closed end are respectively located at two ends of the at least one second opening structure, and the at least one fourth axis is parallel to the at least one second axis.

7. The input apparatus according to claim 6, wherein the at least one third opening structure further comprises a reinforcing closed end extending parallel to the at least one second axis, and located at a side of a boundary between the at least one third closed end and the at least one fourth closed end.

8. The input apparatus according to claim 6, wherein the light guide plate further comprises:
at least one fourth opening structure comprising at least one fifth closed end, wherein the at least one third opening structure further comprises at least one sixth closed end, the at least one fifth closed end is disposed parallel to the at least one sixth closed end along at least one sixth axis, the at least one fifth closed end partially overlaps the at least one sixth closed end on at least one fifth axis, the at least one fifth axis is parallel to the at least one third axis, the at least one third closed end and the at least one sixth closed end are respectively located at two ends of the at least one third opening structure, and the at least one sixth axis is parallel to the at least one fourth axis.

9. The input apparatus according to claim 8, wherein the at least one sixth axis is located between the at least one second axis and the at least one fourth axis.

10. The input apparatus according to claim 8, wherein the at least one fourth axis is located between the at least one second axis and the at least one sixth axis.

11. The input apparatus according to claim 8, wherein the light guide plate further comprises:
at least one reinforcing opening structure extending parallel to the at least one second axis, and located at a side of a boundary between the at least one first closed end and the at least one second closed end, located at a side of a boundary between the at least one third closed end and the at least one fourth closed end, located at a side of a boundary between the at least one fifth closed end and the at least one sixth closed end or a combination thereof.

12. The input apparatus according to claim 1, further comprising:
a circuit board disposed below the light guide plate, wherein the light source is electrically connected to the circuit board, and when the light source emits light, the light is incident to the light guide body, and is reflected by the at least one first closed end and the at least one second closed end, so that the at least two light guide regions are displayed in different colors.

13. The input apparatus according to claim 1, wherein the light source comprises a plurality of light emitting diodes, the side of the light guide plate comprises a protrusion, and one of light emitting diodes is disposed beside the protrusion of the side of the light guide.

14. The input apparatus according to claim 13, wherein the plurality of light emitting diodes comprises red light emitting diodes, blue light emitting diodes, or green light emitting diodes.

15. The input apparatus according to claim 1, wherein the at least one first opening structure comprises a plurality of first opening structures, the at least one second opening structure comprises a plurality of second opening structures, the at least one second axis comprises three second axes, the at least two light guide regions comprise four light guide regions, the plurality of first opening structures and the plurality of second opening structures are disposed along the three second axes to divide the light guide body into the four light guide regions.

* * * * *